April 28, 1964 R. J. INGHAM 3,130,705
POINTER MOUNTING
Filed Aug. 31, 1962

INVENTOR.
ROBERT J. INGHAM
BY *M. W. Gooderia*
ATTORNEY

United States Patent Office 3,130,705
Patented Apr. 28, 1964

3,130,705
POINTER MOUNTING
Robert J. Ingham, Fairfield, Conn., assignor to Manning, Maxwell & Moore, Incorporated, Stratford, Conn., a corporation of New Jersey
Filed Aug. 31, 1962, Ser. No. 220,803
2 Claims. (Cl. 116—136.5)

This invention relates to novel and improved means for mounting the pointer of a dial instrument on a shaft or arbor for rotation with the shaft.

In the manufacture of dial instruments, for example, Bourdon tube pressure gages, it is a known practice to provide the pointer of the instrument with an aperture in which is fitted a shaft or arbor with which the pointer moves. The pointer is often rotatively connected to the shaft by staking the shaft to the pointer. However, when the instrument is subjected to high acceleration forces particularly in a direction about the rotational axis of the pointer, the inertia of the pointer often causes slippage between the pointer and shaft mounting the same. While a reduction in weight of the pointer will have some advantageous results, even with light weight aluminum pointers, there is still a tendency for such slippage to occur.

Accordingly, it is the object of this invention to provide novel and improved means for mounting a pointer on a pointer shaft which will eliminate slippage between the pointer and shaft occurring in response to torsional accelerations on the pointer about the rotational axis thereof.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
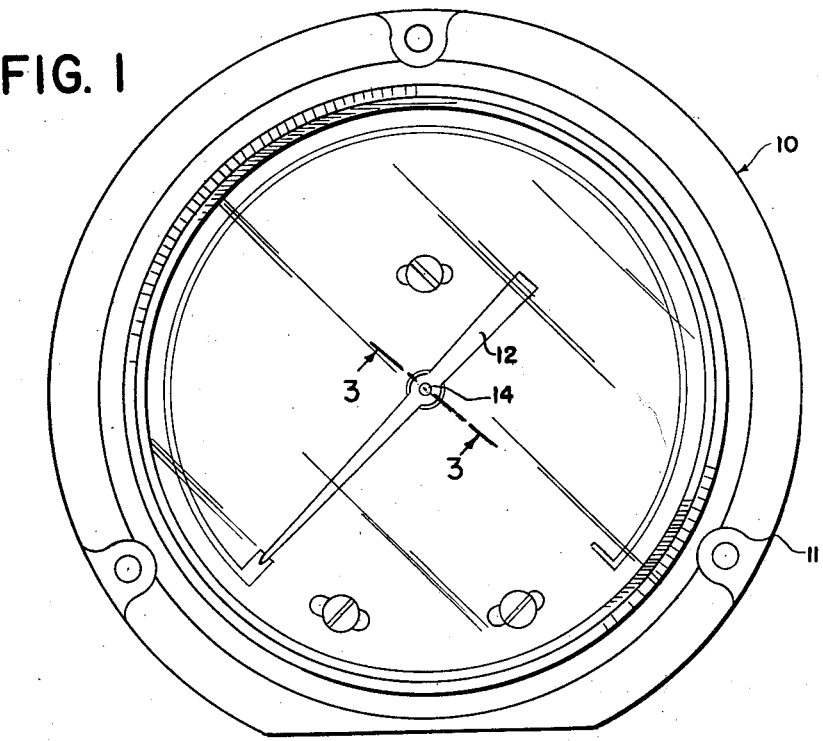
FIG. 1 is front view of a dial instrument incorporating the present invention.
Figure 3:
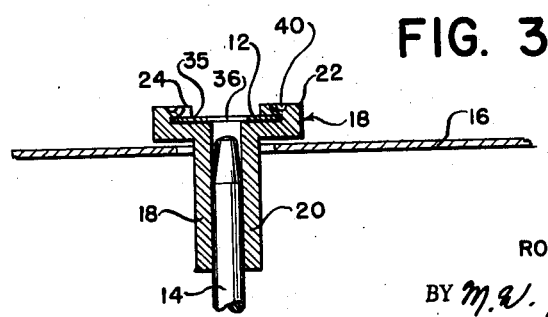
FIG. 3 is an enlarged, fragmentary, cross-sectional view substantially along the line 3—3 of FIG. 1.

With reference to FIG. 1 of the drawing, there is shown at 10 an exemplary dial instrument of a type with which this invention is concerned. The instrument comprises a casing 11 housing the instrument drive mechanism. Within the casing is an elongated pointer 12 which is movable with a shaft 14. As shown in FIGS. 1 and 3, the pointer moves over a dial 16 supported on the casing 11.

Figure 2:
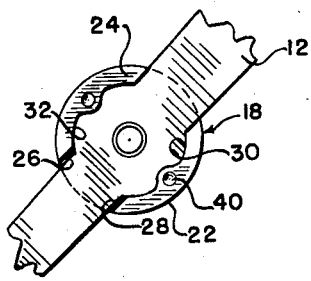
FIG. 2 is enlarged fragmentary plan view of the pointer and pointer mounting means of the instrument of FIG. 1.

In accordance with the invention, the pointer 12 is mounted for movement with the shaft 14 by a mounting member generally indicated at 18 in FIGS. 2 and 3. As shown in FIG. 2, the mounting member has a cylindrical body or hub 20 within which the shaft 14 is coaxially received. The body 20 is suitably fixed to the shaft 14 so as to be rotatable therewith and so as to be rigid with the shaft even under relatively high torsional loading of the body 20. The body portion 20 of the mounting member terminates at its outer end in an enlarged, circular, flange-like portion 22. The enlarged portion 22 has a surface 24 which faces axially away from the shaft 14 and has a general plane extending at right angles to the shaft axis.

The surface 24 of the enlarged end portion 22 of the mounting member is provided with a shaped cavity defined by a pair of sides 26, 28 which as shown in FIG. 2 each extend at right angles to a radius of the mounting member body 20 and shaft 14 and are spaced from the shaft axis. Also, as shown in FIG. 2, the sides of the cavity are provided intermediate their ends with arcuate portions 30, 32 respectively. The arcuate portions 30, 32 each extend about the axis of the shaft and are concentric therewith.

The pointer 12 is preferably fabricated of light metal such as aluminum so as to reduce inertia effects during torsional acceleration loading of the pointer. The pointer is provided intermediate its ends with an enlarged generally circular portion 35 which is shaped to fit closely within the arcuate portions of the sides of the shaped cavity in the mounting member 18. The sides of the pointer extending from the intermediate portion 35 are shaped to fit closely between the generally straight portions of sides 26, 28 of the shaped cavity in the mounting member 18.

From the foregoing, it will be apparent that the pointer will be restrained against movement relative to the shaft 14 in a direction about the shaft axis by the sides 26, 28 of the shaped cavity in the mounting member; and further the pointer will be restrained against movement longitudinally of itself and in any direction radially of the shaft axis by the arcuate portions of the sides of the shaped cavity which are engageable with the complementally shaped portion of the pointer. In order to retain the pointer in the cavity in the mounting member, the bordering edge portions of the arcuate portions of the sides of the cavity are staked as at 40, over the pointer 12.

When the pointer is subjected to severe acceleration forces directed radially of the shaft axis, the relatively broad bearing surfaces of the sides of the cavity tend to distribute the loading and prevent deformation of the pointer. It will be observed that the pointer has an aperture 36 coaxially aligned with the shaft 20. The diameter of the aperture 36 is substantially greater than the diameter of the shaft 20 so that even if the shaft 14 extends up into the aperture, it will be spaced from the bordering edge portion of the aperture. This spacing is desired to assure that high forces on the pointer, directed radially of the shaft, will not result in local high stresses in and deformation of the pointer by reason of engagement of the pointer with the small diameter shaft 14.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention, which, as a matter of language, might be said to fall therebetween.

I claim:

1. In a dial instrument, a rotatable shaft, a mounting member comprising a hub portion fixed to said shaft and terminating at one end in an enlarged portion having a surface facing axially away from said shaft, said surface having a shaped cavity having a pair of spaced apart sides each extending generally at right angles to a radius of the shaft axis and spaced from the shaft axis, each side having an intermediate arcuate portion extending about the shaft axis, and a light weight pointer spaced from said shaft and having an integral portion fitting said cavity.

2. In a dial instrument as described in claim 1, said arcuate portion of said sides of the cavity being concentric with the shaft axis, a portion of each of said sides of the cavity being deformed inwardly of the shaft axis and over said portion of the pointer to retain the pointer in said cavity.

References Cited in the file of this patent

UNITED STATES PATENTS

| | | |
|---|---|---|
| 2,689,617 | Bouley | Sept. 21, 1954 |
| 2,735,068 | Wolferz | Feb. 14, 1956 |
| 2,794,509 | Mix | June 4, 1957 |

FOREIGN PATENTS

| | | |
|---|---|---|
| 642,962 | France | May 10, 1928 |